(12) United States Patent
Lee

(10) Patent No.: US 10,355,506 B2
(45) Date of Patent: Jul. 16, 2019

(54) POWER SUPPLYING SYSTEM AND METHOD

(71) Applicant: NANNING FUGUI PRECISION INDUSTRIAL CO., LTD., Nanning (CN)

(72) Inventor: Chi-Jung Lee, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 309 days.

(21) Appl. No.: 15/243,920

(22) Filed: Aug. 22, 2016

(65) Prior Publication Data

US 2017/0366030 A1    Dec. 21, 2017

(30) Foreign Application Priority Data

Jun. 17, 2016    (TW) .............................. 105119085 A

(51) Int. Cl.
| | |
|---|---|
| *H02J 7/00* | (2006.01) |
| *H02M 1/00* | (2006.01) |
| *H02M 3/335* | (2006.01) |
| *H02J 9/00* | (2006.01) |
| *H02J 7/34* | (2006.01) |

(52) U.S. Cl.
CPC .......... *H02J 7/0068* (2013.01); *H02J 7/0083* (2013.01); *H02J 7/0088* (2013.01); *H02J 7/345* (2013.01); *H02J 9/005* (2013.01); *H02M 3/33507* (2013.01); *H02M 2001/0032* (2013.01)

(58) Field of Classification Search
USPC ........................................... 307/64, 115, 126
See application file for complete search history.

(56) References Cited

U.S. PATENT DOCUMENTS

| | | | |
|---|---|---|---|
| 2011/0103104 A1* | 5/2011 | Zhan | ................. H02M 3/33507 363/21.17 |
| 2014/0064500 A1 | 3/2014 | Lee | |
| 2014/0358311 A1* | 12/2014 | Lai | ......................... G01D 4/002 700/295 |

(Continued)

FOREIGN PATENT DOCUMENTS

| | | |
|---|---|---|
| CN | 201499011 U | 6/2010 |
| CN | 102130488 A | 7/2011 |

(Continued)

*Primary Examiner* — Danny Nguyen
(74) *Attorney, Agent, or Firm* — ScienBiziP, P.C.

(57) ABSTRACT

A system for supplying adapted power to an electronic device with a reduced level of power consumption when the device is not in use includes a first power supplying module, a control module coupled to the first power supplying module, and an MCU coupled to the control module and coupled to the electronic device. The MCU is configured to switch on the first power supplying module when the first power supplying module is in normal state, the normal state being an AC power supply coupled to the first power supplying module. The MCU detects an instant mode of the electronic device and outputs a first signal to the control module when the electronic device is in a standby mode. The control module is configured to switch off the first power supplying module when the first signal is received. A power supplying method is further provided.

14 Claims, 5 Drawing Sheets

(56) References Cited

U.S. PATENT DOCUMENTS

2015/0338901 A1* 11/2015 Petrovic ................. G06F 1/263
 307/23
2016/0124482 A1 5/2016 Yu et al.

FOREIGN PATENT DOCUMENTS

| CN | 103313003 A | 9/2013 |
| CN | 104679214 A | 6/2015 |
| JP | 2004139580 A | 5/2004 |
| TW | 201419879 A | 5/2014 |
| TW | 201443634 A | 11/2014 |
| TW | 484721 B | 5/2015 |
| TW | 525423 B | 3/2016 |

* cited by examiner

POWER SUPPLYING SYSTEM AND METHOD

FIELD

The subject matter herein generally relates to power supply system and method.

BACKGROUND

An external power adapter is generally used for supplying power for an electronic device, such as telephone in a conference call, and so on. Even when the electronic device is not in operation, electrical power loss continues through the external adapter.

BRIEF DESCRIPTION OF THE DRAWINGS

Implementations of the present technology will now be described, by way of example only, with reference to the attached figures.

DETAILED DESCRIPTION

Figure 1:
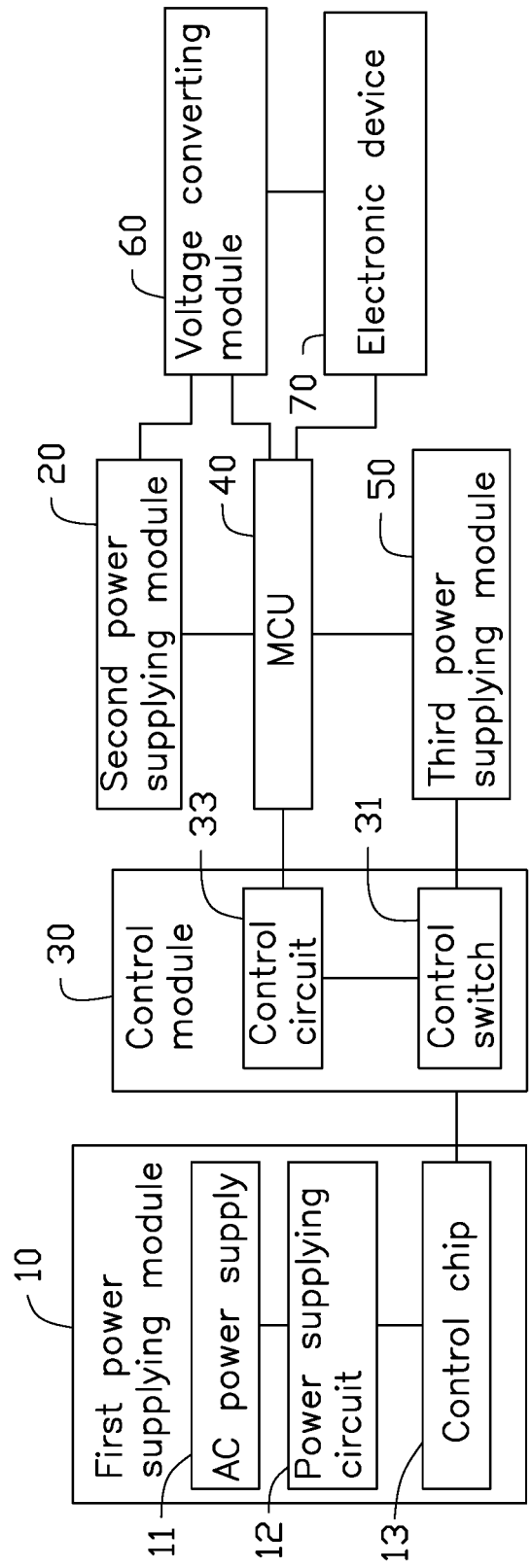
FIG. 1 is a block diagram of one embodiment of a power supplying system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
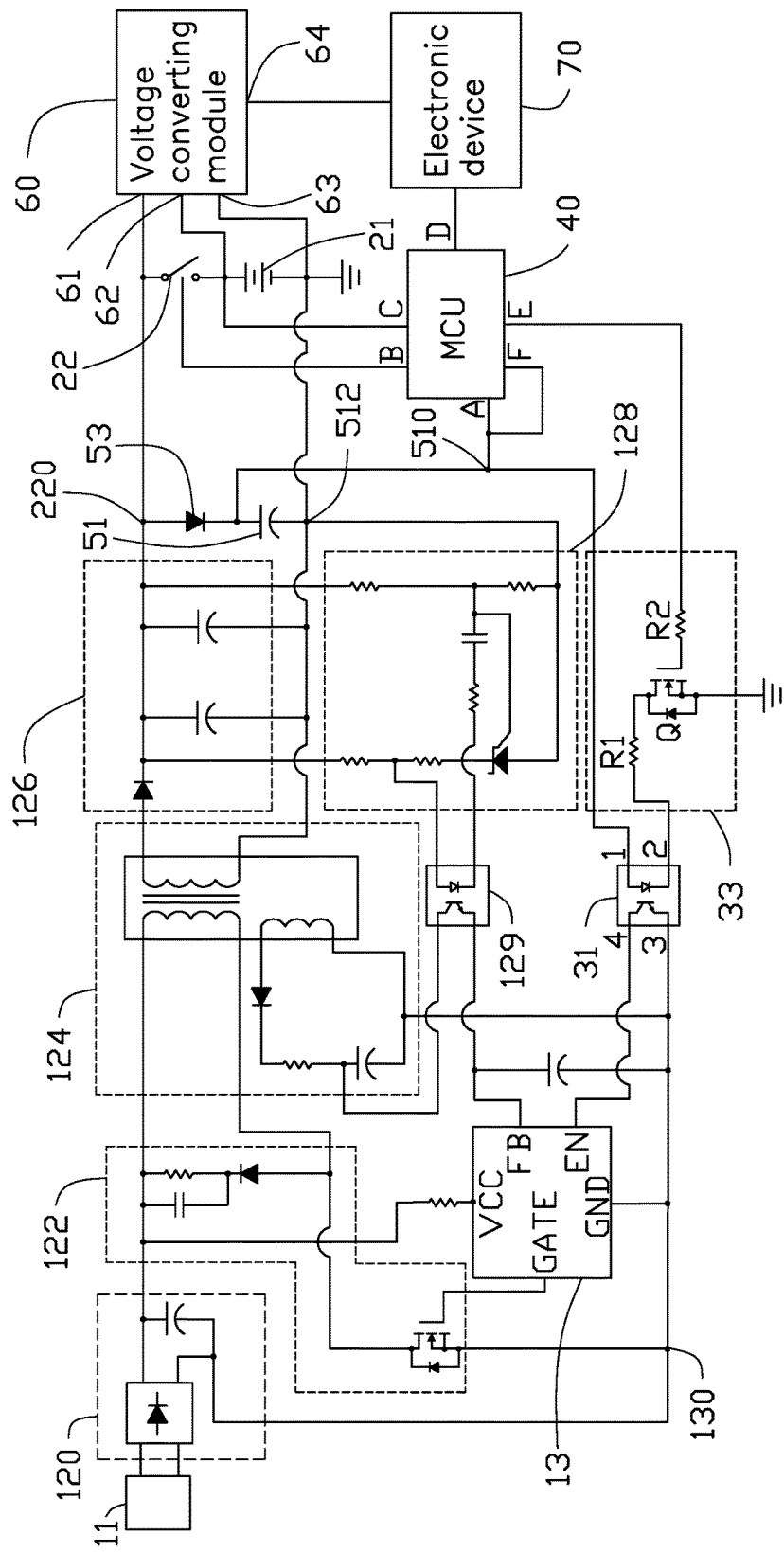
FIG. 2 is a circuit diagram of the power supplying system of FIG. 1.

FIG. 1 and FIG. 2 illustrate a power supplying system in accordance with an embodiment. The power supplying system can include a first power supplying module 10, a second power supplying module 20, a control module 30, a micro control unit (MCU) 40, a third power supplying module 50, and a voltage converting module 60.

The first power supplying module 10 is coupled to the control module 30 and the third power supplying module 50. The control module 30 is coupled to the MCU 40. The MCU 40 is coupled to the second power supplying module 20 and the third power supplying module 50. The first power supplying module 10, the second power supplying module 20, and the third power supplying module 50 are coupled to the voltage converting module 60. The MCU 40 and the voltage converting module 60 are coupled to an electronic device 70.

The first power supplying module 10 can include an AC power supply 11, a power supplying circuit 12 coupled to the AC power supply 11, and a control chip 14 coupled to the power supplying circuit 12. The power supply circuit is configured to convert an AC voltage output from the AC power supply to a first voltage and output the first voltage.

The power supply circuit 12 can include a first rectification filter circuit 120, a switch circuit 122, a transformer 124, a second rectification filter circuit 126, and a feedback circuit 128.

The AC power supply 11 is coupled to the first rectification filter circuit 120. The first rectification filter circuit 120 is coupled to a first terminal of the switch circuit 122. A second terminal of the switch circuit 122 is coupled to the transformer 124 and the control chip 13. The transformer 124 is coupled to the second rectification filter circuit 126. The second rectification filter circuit 126 is coupled to the feedback circuit 128. A first switch 129 is coupled between the control chip 13 and the feedback circuit 128.

In at least one embodiment, the control chip 13 is a pulse width modulation (PWM) control chip and comprises an enable terminal EN, a gate terminal GATE, a power terminal VCC, a feedback terminal FB, and a grounded terminal GND.

The second power supplying module 20 can include a battery 21 and an electronic switch 22.

The control module 30 can include a control switch 31 and a control circuit 33. The control chip 13 is coupled to the control switch 31. The control switch 31 is coupled to the control circuit 33. The control circuit 33 is coupled to the MCU 40. The control circuit 33 can include a transistor Q, a first resistor R1, and a second resistor R2. The transistor Q has a gate, a source, and a drain. In at least one embodiment, the control switch 31 is an optical coupler.

The third power supplying module 50 can include a super capacitor 51 and a diode 53. When the electric energy of the super capacitor 51 is empty, the control switch 31 is switched off and the enable terminal EN receives a high level signal to enable the control chip 13 to control the first power supply module 10 to supply power to the super capacitor 51, so that the super capacitor 51 is charged.

The MCU 40 can include a power terminal A, a switch control terminal B, a power detection terminal C, a signal detection terminal D, a circuit control terminal E, and a voltage detection terminal F. The MCU 40 is configured to enable or disable the control chip 13 via the control module 30.

The voltage converting module 60 can include a first input port 61, a second input port 62, a ground port 63, and an output port 64. The first input port 61 is configured to receive the first voltage from the first power supplying module 10. The second input port 62 is configured to receive the second voltage from the second power supplying module 20. The output port 64 is configured to output a third voltage by converting the first voltage or the second voltage.

The first power supplying module 10 has two states, normal and abnormal. When the first power supplying module 10 is in normal state and the control chip 13 is enabled, the first power supplying module 10 is configured to supply power for the electronic device 70, the battery 21, and the super capacity 51. When the control chip 13 is disabled, the first power supplying module 10 cannot supply power. When the first power supplying module 10 is in abnormal state, the second power supplying module 20 is configured to supply power for the electronic device 70. In at least one embodiment, when the AC power 11 is connected to the power supplying circuit 12, the first power supplying module 10 is in normal state. When when the AC power 11 is disconnected from the power supplying circuit 12, the first power supplying module 10 is in abnormal state.

The MCU 40 is configured to detect a current mode of the electronic device 70. The current mode of the electronic device 70 can include a standby mode and an operation mode.

When the electronic device 70 is in the operation mode and the first power supplying module 10 is in normal state, the first power supplying module 10 supplies the first voltage to the voltage converting module 60 and the voltage converting module 60 outputs the third voltage to supply power to the electronic device 70.

When the electronic device 70 is in the operation mode and the first power supplying module 10 is in abnormal state, the battery 21 supplies the second voltage to the voltage converting module 60, and the voltage converting module 60 outputs the third voltage to supply power to the electronic device 70.

The MCU 40 stores an operation voltage, a first reference voltage, a second reference power, a first preset voltage, and a second preset voltage. The MCU 40 is further configured to detect an instant voltage of the super capacitor 51 and to compare the instant voltage of the super capacitor 51 with the operation voltage of the MCU 40. When the instant voltage of the super capacitor 51 is charged to be equal to the operation voltage of the MCU 40, the super capacitor 51 supplies power for the MCU 40, and the MCU 40 is initialized to control the control module 30 and enable the control chip 13 to switch off the electronic switch 22.

The MCU 40 is further configured to detect an instant available power of the battery 21 and control the electronic switch 22 to be switched on when the instant available power of the battery 21 is lower than the first reference power, and the first power supplying module 10 supplies power for the battery 21 to charge the battery 21.

The MCU 40 is further configured to compare the instant voltage of the super capacitor 51 with the first preset voltage and the second preset voltage of the MCU 40.

When the first power supplying module 10 is in normal state and the instant voltage of the super capacitor 51 is charged to be equal to the operation voltage of the MCU 40, the MCU is initialized. When the instant voltage of the super capacitor 51 is lower than the operation voltage of the MCU 40, the first power supplying module 10 supplies power for the super capacitor 51 to charge the super capacitor 51.

The AC power 11 is coupled to the first rectification filter circuit 120. The first rectification filter circuit 120 is coupled to a first node 130 and the switch circuit 122. The switch circuit 122 is coupled to the first node 130, the gate terminal and power terminal VCC of the control chip 13, and the transformer 124. The ground terminal GND is coupled to the first node 130. The feedback terminal FB of the control chip 13 is coupled to a port 3 of the first switch 129. The enable terminal EN of the control chip 13 is coupled to a port 4 of the control switch 31. A port 3 of the control switch 31 is coupled to the first node 130. A port 1 of the control switch 31 is coupled to a second node 510. A port 2 of the control switch 31 is coupled to a first terminal of the first resistor R1. A second terminal of the first resistor R1 is coupled to the drain of the transistor Q. The source of the transistor Q is grounded. The gate of the transistor Q is coupled to a first terminal of the second resistor R2. A second terminal of the second resistor R2 is coupled to the circuit control terminal E of the MCU 40.

A first terminal of the super capacitor 51 is coupled to the second node 510. A second terminal of the super capacitor 51 is coupled to a third node 512. The second rectification filter circuit 126 is coupled to the third node 512. The second node 510 is coupled to a fourth node 220 via the diode 53. The fourth node 220 is coupled to the first input port of the voltage converting module 60 and the first terminal of the electronic switch 22. The second terminal of the electronic switch 22 is coupled to the switch control terminal B of the MCU 40. The third terminal of the electronic switch 22 is coupled to the second input terminal of the voltage converting module 60. The second input terminal of the voltage converting module 60 is coupled to the positive pole of the battery 21 and the power detection terminal C of the MCU 40. The ground terminal 63 of the voltage converting module 60 is coupled to the third node 512 and the negative pole of the battery 21. The output terminal 64 of the voltage converting module 60 is coupled to a first terminal of the electronic device 70. A second terminal of the electronic device 70 is coupled to a signal detection terminal D of the MCU 40.

When the signal detection terminal D of the MCU 40 detects a first signal with a high level voltage, the MCU 40 determines that the electronic device 70 is in the operation mode and outputs a second signal. The second signal is a low level voltage from the circuit control terminal E to the control circuit 33. The control circuit 33 controls the control switch 31 to output an enable signal with a high level voltage to the enable terminal EN of the control chip 13 according to the second signal. The enable terminal EN of the control chip 13 controls the first power supplying module 10 to supply power for the electronic device 70. The power detection terminal C detects whether the available power of the battery 21 is lower than the first reference power. The switch control terminal B outputs a fifth signal with a high lever voltage to the electronic switch 22 when the available power of the battery 21 is lower than the first reference power. The electronic switch 22 is switched on when the fifth signal is received. The first power supplying module 10 supplies power for the battery 21 to charge the battery 21 when the electronic switch 22 is switched on. The power detection terminal C further detects whether the battery 21 is charged to the second reference power. The switch control terminal B of the MCU 40 outputs a sixth signal with a lower level voltage to the electronic switch 22 when the power of the battery 21 is charged to the second reference power. The electronic switch 22 is switched off when received the sixth signal. The first power supplying module 10 stops supplying power for the battery 21 when the electronic switch 22 is switched off.

When the signal detection terminal D of the MCU 40 detects a third signal with a low level voltage, the MCU 40 determines that the electronic device 70 is in the standby mode and outputs a fourth signal. The fourth signal is a high level voltage from the circuit control terminal E to the control circuit 33. The control circuit 33 switches on the control switch 31 and disables the control chip 13 according to the fourth signal. The first power supplying module 10 stops supplying power for the electronic device 70.

When the first power supplying module 10 is in abnormal state, the MCU 40 controls the battery 21 to supply power for the electronic device 70.

Figure 3:
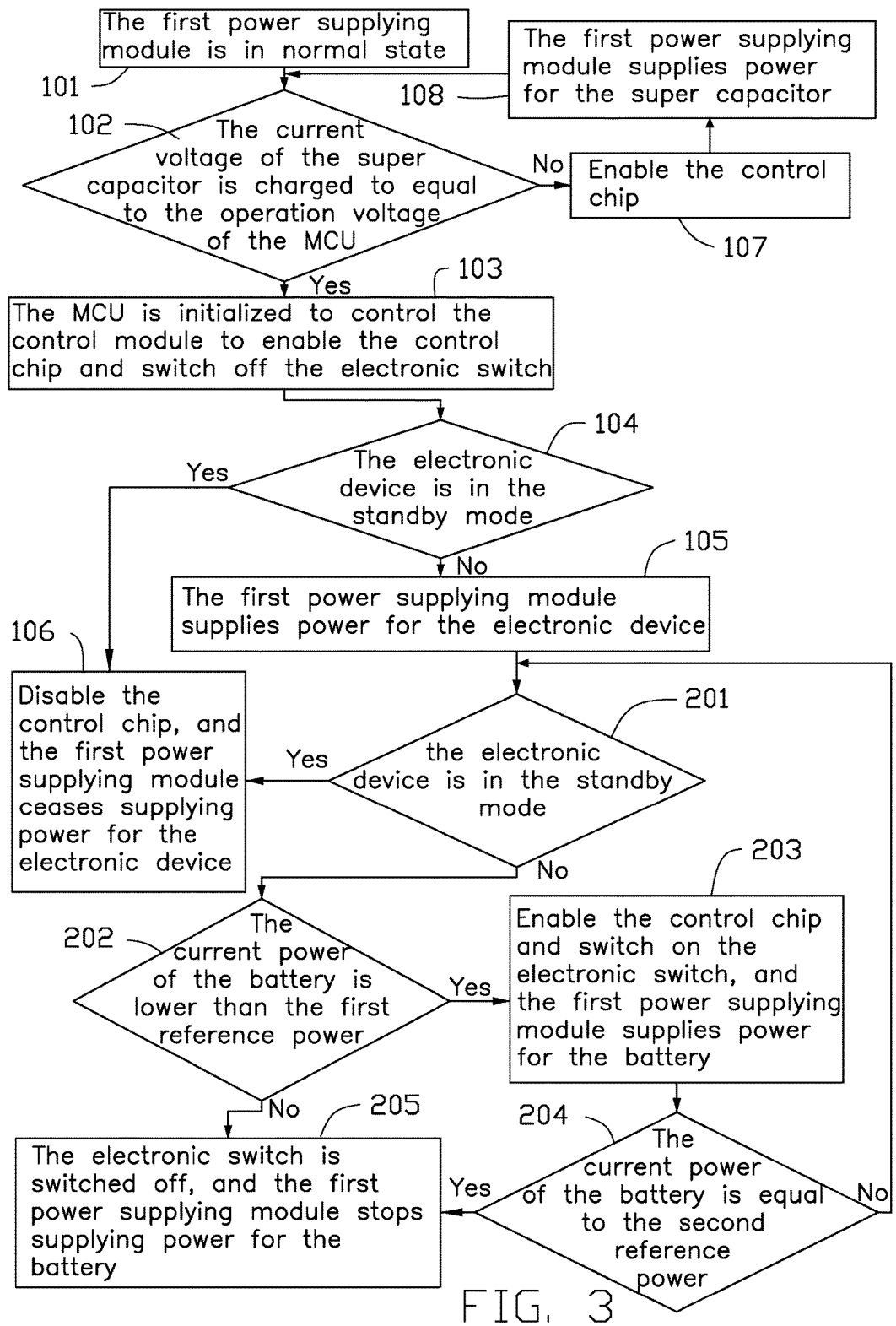
FIG. 3 is a flowchart of one embodiment of a power supplying method which can be applied to the power supplying system of FIG. 1.

Referring to FIG. 3, a flowchart is presented in accordance with an example embodiment of a power supplying method. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 101.

At block 101, the first power supplying module 10 is in normal state.

At block 102, a determination is made as to whether the instant voltage of the super capacitor 51 is charged to be equal to the operation voltage of the MCU 40, if yes, block 103 is performed, if not, block 107 is performed.

At block 103, the MCU 40 is initialized to control the control module 30 to enable the control chip 13 to switch off the electronic switch 22.

At block 104, the MCU 40 determines whether the electronic device 70 is in the standby mode, if yes, block S106 is performed, if not, block S105 is performed.

At block 105, the first power supplying module 10 supplies power for the electronic device 70 through the voltage converting module 60, and then block 201 is performed.

At block 106, the MCU 40 controls the control module 30 to disable the control chip 13, and the first power supplying module 10 ceases supplying power for the electronic device 70, and block 301 is then performed.

At block 107, the MCU 40 controls the control module 30 to enable the control chip 13.

At block 108, the first power supplying module 10 supplies power for the super capacitor 51 to charge the super capacitor 51, the process then returns to block 102.

At block 201, the MCU 40 determines whether the electronic device 70 is in the standby mode, if yes, block 106 is performed, if not, block 202 is performed.

At block 202, the MCU 40 determines whether the instant available power of the battery 21 is lower than the first reference power, if yes, block 205 is performed, if not, block 203 is performed.

At block 203, the MCU 40 controls the control module 30 to enable the control chip 13 to switch on the electronic switch 22, and the first power supplying module 10 supplies power for the battery 21 to charge the battery 21.

At block 204, the MCU 40 determines whether the instant available power of the battery 21 is equal to the second reference power, if yes, block 205 is performed, if not, block 201 is performed.

At block 205, the MCU 40 controls the electronic switch 22 to be switched off, and the first power supplying module 10 stops supplying power for the battery 21.

Figure 4:
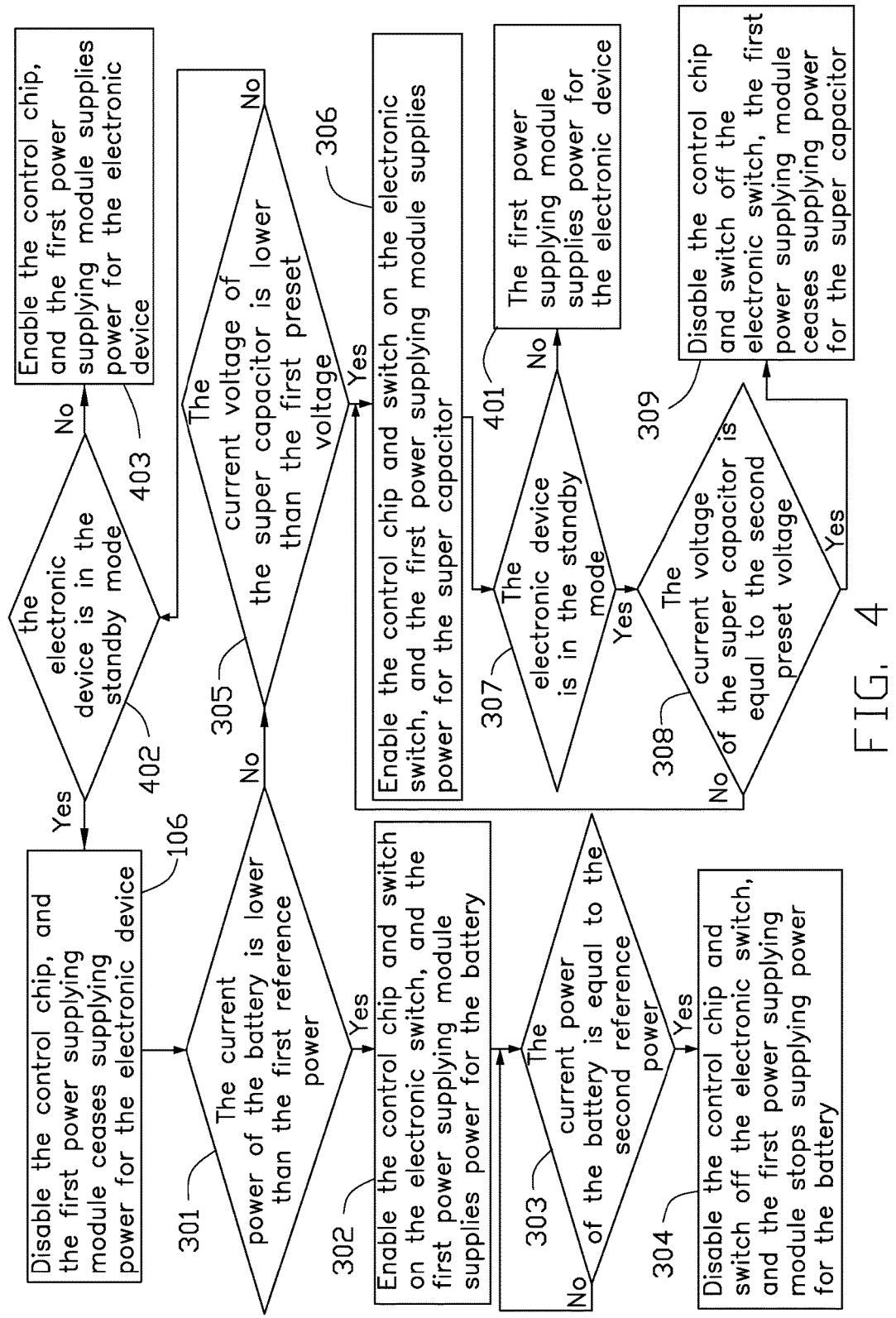
FIG. 4 is flowchart of the continuation of the power supplying method of FIG. 3.

Referring to FIG. 4, the power supplying method further comprises:

At block 301, the MCU 40 determines whether the instant available power of the battery 21 is lower than the first reference power, if yes, block 302 is performed, if not, block 205 is performed.

At block 302, the MCU 40 controls the control module 30 to enable the control chip 13 to switch on the electronic switch 22, and the first power supplying module 10 supplies power for the battery 21 to charge the battery 21.

At block 303, the MCU 40 determines whether the instant available power of the battery 21 is equal to the second reference power, if yes, block 304 is performed, if not, block 302 is performed.

At block 304, the MCU 40 controls the control module 30 to disable the control chip 13 and switch off the electronic switch 22, and the first power supplying module 10 stops supplying power for the battery 21.

At block 305, the MCU 40 determines whether the instant voltage of the super capacitor 51 is lower than the first preset voltage, if yes, block 306 is performed, if not, block 402 is performed.

At block 306, the MCU 40 controls the control module 30 to enable the control chip 13 to switch on the electronic switch 22, and the first power supplying module 10 supplies power to the super capacitor 51 to charge the super capacitor 51.

At block 307, the MCU 40 determines whether the electronic device 70 is in the standby mode, if yes, block 308 is performed, if not, block 401 is performed.

At block 308, the MCU 40 determines whether the instant voltage of the super capacitor 51 is equal to the second preset voltage, if yes, block 309 is performed, if not, block 306 is performed.

At block 309, the MCU 40 controls the control module 30 to disable the control chip 13 to switch off the electronic switch 22, the first power supplying module 10 ceases supplying power for the super capacitor 51.

At block 401, the first power supplying module 10 supplies power for the electronic device 70 through the voltage converting module 60.

At block 402, the MCU 40 determines whether the electronic device 70 is in the standby mode, if yes, block 106 is performed, if not, block 403 is performed.

At block 403, the MCU 40 controls the control module 30 to enable the control chip 13 and the first power supplying module 10 to supply power for the electronic device 70.

Figure 5:
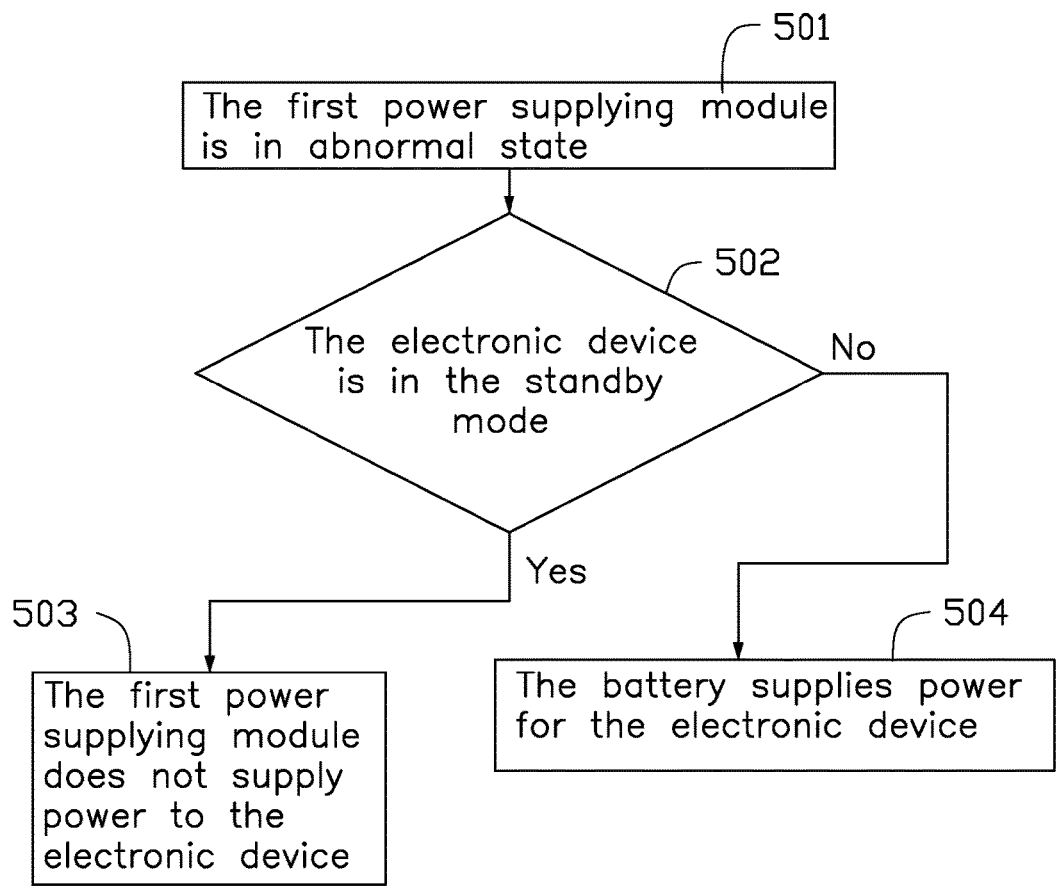
FIG. 5 is a third flowchart of the power supplying method of FIG. 3.

Referring to FIG. 5, the power supplying method further comprises:

At block 501, the first power supplying module 10 is in abnormal state.

At block 502, the MCU 40 determines whether the electronic device 70 is in the standby mode, if yes, block 503 is performed, if not, block 504 is performed.

At block 503, the first power supplying module 10 supplies no power to the electronic device 70.

At block 504, the battery 21 supplies power for the electronic device 70 through the voltage converting module 60.

In at least one embodiment, the electronic device 70 is a telephone in a conference call. The operation mode is talk mode and the first reference power is 50% of a rated power of the battery 21. The second reference power is 99% of the rated power of the battery 21, the first preset voltage is 2.7 V, and the second preset voltage is 4.7 V.

The embodiments shown and described above are only examples. Many details are often found in the art such as the other features of a power supplying system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supplying system comprising:
   a first power supplying module;
   a control module coupled to the first power supplying module; and
   a micro control unit (MCU) coupled to the control module and an electronic device;
   wherein the MCU is configured to switch on the first power supplying module when the first power supplying module is in normal, that the first power supplying module is coupled to an AC power supply; the MCU is further configured to detect a current mode of the electronic device and output a first signal to the control module when the electronic device is in a standby mode; and the control module is configured to switch off the first power supplying module when receiving the first signal;
   wherein the control module comprises a control circuit and a control switch, the control circuit is coupled to the MCU, the control switch is coupled to the control circuit and the first power supplying module, the control circuit is configured to switch on the control switch when receiving the first signal, and the first power supplying module does not supply power when the control switch is switched on; and
   wherein the first power supplying module comprises a control chip coupled to the control switch, the control switch is configured to output an enable signal to the control chip to enable the control chip when being switched off, and the first power supplying module does not supply power when the control chip is enabled.

2. The power supplying system of claim 1, wherein the AC power supply is coupled to a rectification filter circuit, which is coupled to a switch circuit; the control circuit comprises a transistor, a first resistor, and a second resistor, a port of the control switch is coupled to a first terminal of the first resistor, a second terminal of the first resistor is coupled to the drain of the transistor; the source of the transistor is grounded; the gate of the transistor is coupled to a first terminal of the second resistor; and a second terminal of the second resistor is coupled to a circuit control terminal of the MCU.

3. The power supplying system of claim 2, wherein the first rectification filter circuit is coupled to a first terminal of the switch circuit, and a second terminal of the switch circuit is coupled to a transformer and the control chip.

4. The power supplying system of claim 1, wherein the control switch is an optical coupler.

5. The power supplying system of claim 1, wherein the power supplying module further comprises a voltage converting module coupled to the MCU, the first power supplying module, and the electronic device, the first power supplying module outputs a first voltage when being in normal, and the voltage converting module converts the first voltage to a second voltage to supply power for the electronic devices.

6. The power supplying system of claim 1, further comprising a second power supplying module coupled to the MCU, wherein the second power supplying module is configured to supply power for the electronic device when the first power supplying module is in abnormal and the electronic device is in an operation mode.

7. The power supplying system of claim 1, wherein the MCU comprises a detection terminal, when the detection terminal receives the first signal with a high level voltage, the MCU determines the electronic device is in the operation mode; and when the detection terminal receives a second signal with a low level voltage, the MCU determines the electronic device is in the standby mode.

8. The power supplying system of claim 1, further comprising a super capacitor coupled to the first power supplying module, the MCU, and the control module, wherein the MCU switches on the first power supplying module when a current voltage of the super capacitor is charged to equal to an operation of the MCU.

9. A power supplying method comprising:
   activating a first power supplying module;
   detecting an electronic device is in a standby mode by a MCU;
   sending a first signal to a control module by the MCU; and
   stopping powering for the electronic device from the first power supplying module by the control module;
   determining a current voltage of a super capacitor;
   comparing the current voltage with an operation of the MCU; and
   activating the MCU when the current voltage of the super capacitor is charged to equal to the operation of the MCU.

10. The power supplying method of claim 9, further comprising:
    comparing the current voltage with a first preset voltage by the MCU;
    enabling a control chip and switching off an electronic switch; and
    supplying power for the super capacitor to charge the super capacitor when the current voltage is lower than the first preset voltage.

11. The power supplying method of claim 10, further comprising:
    comparing the current voltage with a second preset voltage by the MCU;
    disabling the control chip and switching on an electronic switch; and
    stopping supplying power for the super capacitor when the current voltage is equal to the second preset voltage.

12. The power supplying method of claim 9, further comprising:
    detecting a current power of a battery;
    comparing the current power with a reference power; and
    charging the battery by the first power supplying module.

13. The power supplying method of claim 12, further comprising:
    supplying power for the electronic device when the first power supplying module is in abnormal and the electronic device is in an operation mode.

14. The power supplying method of claim 11, wherein the electronic switch is an optical coupler.

* * * * *